(12) United States Patent  
Satran

(10) Patent No.: US 8,468,319 B1
(45) Date of Patent: Jun. 18, 2013

(54) CONCURRENT ACCESS TO A SINGLE DISK TRACK BY COMBINING READS AND WRITES TO A DISK WITH A MASK

(75) Inventor: Julian Satran, Omer (IL)

(73) Assignee: Infinidat Ltd., Herzliya (IL)

(*) Notice: Subject to any disclaimer, the term of this patent is extended or adjusted under 35 U.S.C. 154(b) by 264 days.

(21) Appl. No.: 13/004,241

(22) Filed: Jan. 11, 2011

Related U.S. Application Data

(60) Provisional application No. 61/296,311, filed on Jan. 19, 2010.

(51) Int. Cl.
*G06F 12/00* (2006.01)

(52) U.S. Cl.
USPC ............... 711/168; 711/4; 711/111; 711/112; 711/154; 711/158

(58) Field of Classification Search
USPC .............. 711/168, 4, 111, 112, 114, 154, 158
See application file for complete search history.

(56) References Cited

U.S. PATENT DOCUMENTS

| | | | |
|---|---|---|---|
| 5,809,516 A * | 9/1998 | Ukai et al. ................... | 711/114 |
| 6,029,226 A | 2/2000 | Ellis et al. | |
| 6,209,058 B1 | 3/2001 | Shats et al. | |
| 6,442,647 B1 * | 8/2002 | Morton et al. ................ | 711/112 |
| 6,684,287 B1 | 1/2004 | Ng | |
| 6,693,766 B1 | 2/2004 | Wilkes et al. | |
| 6,877,045 B2 * | 4/2005 | Goode et al. ..................... | 710/6 |
| 7,047,357 B1 | 5/2006 | Akiyama | |
| 7,814,271 B2 | 10/2010 | Krantz et al. | |
| 2003/0202270 A1 | 10/2003 | Ng et al. | |
| 2005/0015543 A1 | 1/2005 | Krantz et al. | |

* cited by examiner

*Primary Examiner* — Stephen Elmore
(74) *Attorney, Agent, or Firm* — The Law Office of Michael E. Kondoudis

(57) ABSTRACT

A storage system, a disk controller, a disk drive and a method of operating thereof. The method includes: configuring a disk drive in a manner enabling executing one or more read requests concurrently with executing one or more write requests addressed to the same data track of the disk drive; responsive to a received write request addressed to a certain track of the disk drive, identifying with the help of the control layer one or more read requests concurrent to received write request and addressed to the same track; if the received write request and the identified one or more read requests match a predefined criterion, generating and issuing, with the help of the control layer, a command to the disk drive for executing a single task corresponding to the concurrent read and write requests combined in accordance with a certain mask.

32 Claims, 5 Drawing Sheets

CONCURRENT ACCESS TO A SINGLE DISK TRACK BY COMBINING READS AND WRITES TO A DISK WITH A MASK

CROSS-REFERENCES TO RELATED APPLICATIONS

This application relates to and claims priority from U.S. Provisional Patent Application No. 61/296,311 filed on Jan. 19, 2010 incorporated herein by reference in its entirety.

FIELD OF THE INVENTION

The present invention relates generally to storage systems and methods for storing data on disk drives and particularly to methods of writing data on the disks and storage systems thereof.

BACKGROUND OF THE INVENTION

Systems for storing large amounts of data implement various kinds of mechanisms meant to enhance the level of performance and reliability. Among bottlenecks typically having a negative impact on the ability of a storage system to perform with high levels of throughput and with low latency, is performance of the system's disk drives. Rapid access to data stored on disk media is an important concern in the design of high performance computer systems. Problems of enhancing performance of the disc drives have been recognized in the Prior Art and various systems have been developed to provide a solution as, for example:

U.S. Pat. No. 6,029,226 (Ellis et al.) discloses a method and apparatus for writing data to a storage device such as a hard disk drive in which two write commands from an initiator are processed as a single command at the storage device. A first request is received from a small computer systems interface (SCSI) bus to write a first set of data to a storage device. The first set of data is transferred to memory for temporary storage prior to transfer to the storage device. Thereafter, a second write request is received to write a second set of data to the storage device in which the write request includes a logical block address. An ending logical block address determined after transferring the first set of data is compared to the logical block address of the second request to determine whether the second set of data can be written to the storage device along with the first set of data as a single write operation based on the comparison of the logical block address of the second request and the ending logical block address. In response to a determination that the first set of data and the second set of data can be written to the disk as a single write operation, the second set of data is written to the memory as a part of the first write request.

U.S. Pat. No. 6,209,058 (Shats et al.) discloses a method of data transfer in a cache system comprising a cache buffer including a plurality of data blocks for storing data, and a cache manager for retrieving data from a disk drive and storing the data into the cache buffer. The disk drive includes a data disk having a plurality of concentric data tracks thereon, a spindle motor for rotating the data disk, and a transducer supported by a carrier for positioning the transducer over individual data tracks to write data thereto or read data therefrom. In one embodiment, a method of data transfer in response to a request for retrieving a set of data blocks from the selected track, comprises the steps of: (a) defining a data segment on the selected track, wherein the data segment comprises, in sequence, a pre-fetch data area, a fetch data area comprising the set of data blocks, and a post-fetch data area; (b) determining a landing position of the transducer over the selected track relative to the data segment; and (c) controlling transfer of data from the data segment to the cache buffer based on the landing position relative to the data segment, thus maximizing the data read from the data segment without increasing rotational latency.

U.S. Pat. No. 6,693,766 (Wilkes et al.) discloses an apparatus for surface-based data mapping for a disk drive system and a method of operation in which adjacent data tracks on the data storage surfaces of a disk drive are grouped into data track sets and data track sets on different data storage surfaces are grouped into bunches. The bunches are used to determine how to perform the logical to physical data layout mapping inside the disk drive. A disk drive controller controls disk read/write heads and provides a data layout mapping that maps logically adjacent data blocks to a data track, then to an adjacent data track radially along the same surface in a data track set in a bunch, and then to a different data track in a different data track set in the bunch.

U.S. Pat. No. 6,684,287 (Spencer) discloses a method of writing to a hard disk drive using effective track skew different from the track skew used when reading from the disk. During reads from the disk, the disk controller uses a traditional logical track layout and logical block address (LBA) numbering having a track skew value related to read settle time. A different effective track skew value, optimized for write settle time, is used, however, when writing to the disk. Logical blocks are written to the disk out-of-sequence in order to accommodate this different effective track skew value.

U.S. Pat. No. 7,047,357 discloses a striping disk controller and disk drive system for a computer system. The striping disk controller and disk drive system include an interface connected to the system bus and communicating with the BIOS; first and second disk drives each having data separator electronics, data formatting electronics and head positioning electronics, and a striping controller connected between the first and second disk drives and the interface, the striping controller adapted to cause data being communicated between the system bus and the first and second drives to be written to and read from the first and second drives in an interleaved form and substantially in parallel.

US Patent Application No. 2003/202270 (Ng et al.) discloses a disc drive with a disc having multiple concentric data tracks. A track start point is rotationally displaced by a track skew time relative to a track start point of an adjacent concentric data tracks. The read/write head has a write settling time that is more than the track skew time. A data reordering circuit and firmware reorders write data and provides the reordered data to the read/write head after the write settling time. The reordering of the write data reduces write latency.

US Patent Application 2005/015543 (Krantz et al.) discloses a hard disk unit including a disk, a controller microprocessor, a host bus interface, a buffer memory, a buffer memory controller, and a disk formatter. The bus interface receives write operations, and corresponding write operation data is stored in the buffer memory. The buffer memory controller includes address registers and block count registers. The microprocessor loads the address registers with the buffer memory addresses of multiple write operations and loads the block count registers with the size of the corresponding data. The microprocessor then issues a single command to the buffer memory controller to transfer the data from the buffer memory to the disk formatter. The address registers and block count registers enable the data of multiple write operations to be transferred and written to a disk in an order other than the order in which the write operations were received at the bus interface.

SUMMARY OF THE INVENTION

In accordance with certain aspects of the currently presented subject matter, there is provided a method of operating a storage system comprising a control layer operatively connected to at least one disk drive comprising a plurality of data tracks. The method comprises: a) configuring said at least one disk drive in a manner enabling executing one or more read requests concurrently with executing one or more write requests addressed to the same data track of the disk drive; b) responsive to a received write request addressed to a certain track of said at least one disk drive, identifying with the help of the control layer one or more read requests concurrent to said at least one received write request and addressed to the same track; c) if the received write request and the identified one or more read requests match a predefined criterion, generating and issuing, with the help of the control layer, a command to said at least one disk drive for executing a single task corresponding to said concurrent read and write requests combined in accordance with a certain mask.

The method can further comprise identifying one or more write requests concurrent to said at least one received write request and addressed to the same track; and wherein the generated command for executing a single task further corresponds to said identified concurrent write requests.

In accordance with other aspects of the currently presented subject matter, there is provided a storage system comprising at least one disk drive comprising a plurality of data tracks and operatively connected to a control layer comprising a cache controller operatively connected to a cache memory and to a disk controller, wherein: a) said at least one disk drive is configured to be operable to execute one or more read requests concurrently with executing one or more write requests addressed to the same data track of the disk drive; b) said cache controller is configured, responsive to a received write request addressed to a certain track of said at least one disk drive, to identify one or more read requests concurrent to said at least one received write request and addressed to the same track; and c) said disk controller is configured to generate and issue a command to said at least one disk drive for executing a single task corresponding to said concurrent read and write requests combined in accordance with a certain mask, given that the received write request and the identified one or more read requests match a predefined criterion.

The cache controller can be configured to request the disk controller to generate said command in accordance with said certain mask provided by the cache controller.

Alternatively or additionally, the disk controller can be configured, responsive to a request from the cache controller, to generate at least part of said certain mask in accordance with data and/or metadata received from the cache controller.

In accordance with other aspects of the currently presented subject matter, there is provided a disk drive comprising a plurality of data tracks and operable in a storage system comprising a disk controller operatively connected to the disk drive, wherein the disk drive is operable, responsive to a request from the disk controller, to combine one or more read requests with one or more write requests to be all executed as a single task, wherein said read and write requests are concurrent, addressed to the same track and match a predefined criterion. The disk drive can be further configured to receive a command from the disk controller, said command facilitating to combine said concurrent write and read requests in accordance with a certain mask.

In accordance with other aspects of the currently presented subject matter, there is provided a disk controller operable in a storage system comprising at least one disk drive operatively connected to the disk controller and comprising a plurality of data tracks, wherein the disk controller is operable to issue a command to the disk drive for executing one or more read requests and one or more write requests as a single task, wherein said read and write requests are concurrent, addressed to the same track and match a predefined criterion. The disk controller can be further configured to issue a command to the disk drive, said command facilitating to combine said concurrent write and read requests in accordance with a certain mask.

In accordance with further aspects of the currently presented subject matter one or more read requests concurrent to the received write request can be selected from the group comprising read request received from a client and concurrently pending with the received write request, read request generated by the storage system responsive to the received write request and concurrently pending with the received write request, and read requests to be generated by the storage system responsive to the received write request.

The predefined criterion can be selected from the group comprising relation between data blocks addressed in said concurrent read and write requests; relation between said concurrent read and write requests; origin of said one or more concurrent read requests; status of a cache data slot corresponding to the addressed track, and load of I/O interface of said at least one disk drive; and/or combination thereof. By way of non-limiting example, the predefined criterion can be matched when the concurrent read requests partly addresses data block at least partly differing from data blocks addressed in the received write request. Alternatively or additionally, the predefined criterion can be matched when the received write request requires updating a part of data stored in a certain track and the concurrent read request is necessary for updating a respective Error Correction Portion. Alternatively or additionally, the predefined criterion can be matched when the received write request is addressed to a RAID-protected data and the concurrent read request is necessary for respective parity calculations.

The certain mask can comprise a plurality of pointers indicating one or more portions of the data track to be read from and one or more portions of the data track to be written to during executing said single task.

The command can be a combination of one or more read instructions corresponding to the concurrent read requests, at least one write instruction corresponding to the received write request and said certain mask, wherein said mask comprises a plurality of pointers indicating one or more portions of the data track to be read from and one or more portions of the data track to be written to during executing all respective instructions in a single task, and wherein said read commands and said write command are selected within a set of standard commands available to the disk drive and the disk controller.

Among advantages of certain embodiments of the present invention is enabling enhanced performance of a disk drive due to reducing number of tasks queuing to be performed by the disk drive as well as due to reducing number of "seek" commands and actuator's transfers in the disk drive.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
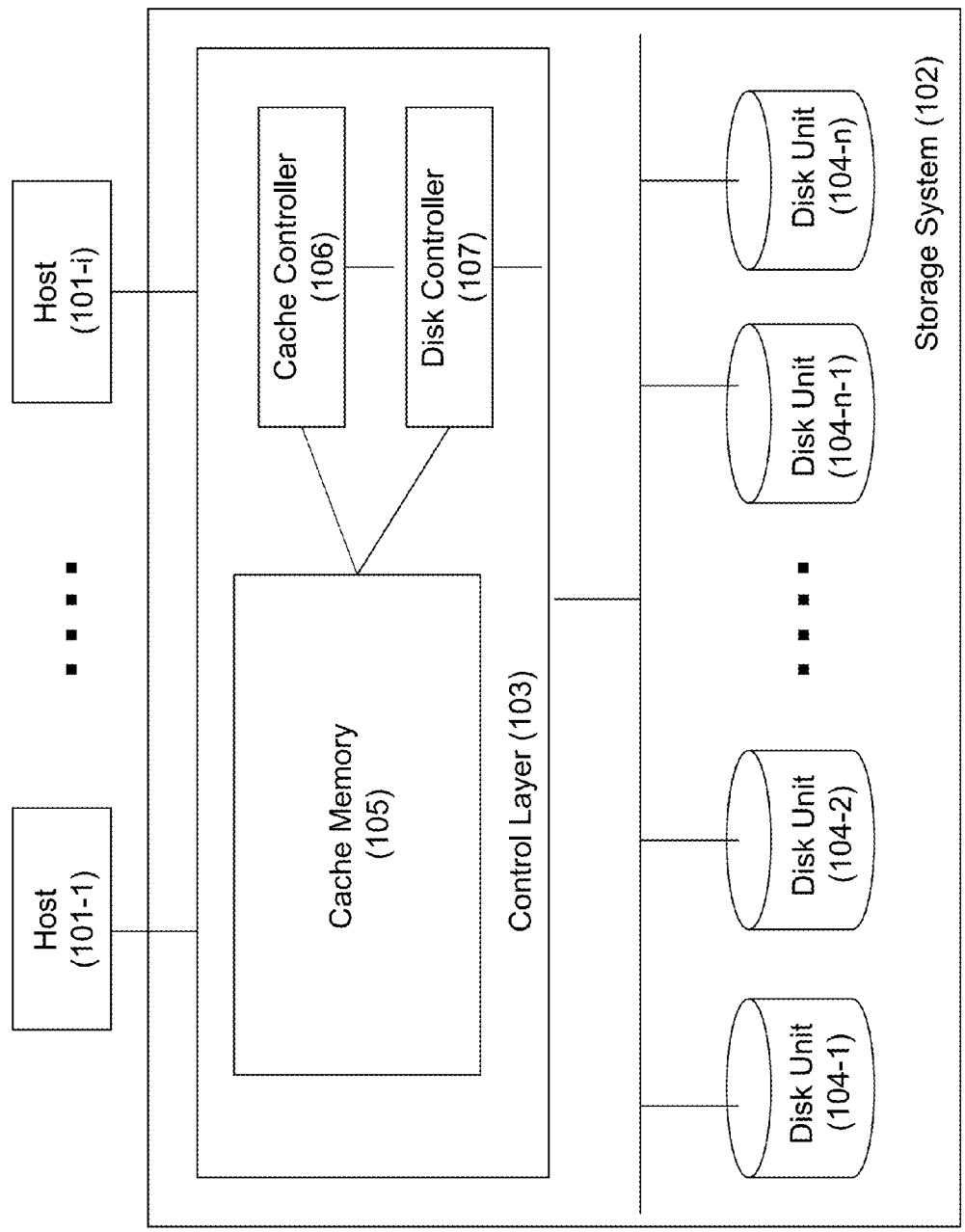
FIG. 1 illustrates a generalized functional block diagram of a mass storage system where the presently disclosed subject matter can be implemented.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "modifying", "calculating", "determining", "generating", "configuring", "allocating", "estimating" or the like, refer to the action and/or processes of a computer that manipulate and/or transform data into other data, said data represented as physical, such as electronic, quantities and/or said data represent one or more physical objects. The term "computer" should be expansively construed to cover any kind of electronic device with data processing capabilities, including, by way of non-limiting example, storage system and parts thereof disclosed in the present applications.

The term "criterion" used in this patent specification should be expansively construed to include any compound criterion, including, for example, several criteria and/or their logical combinations.

The operations in accordance with the teachings herein may be performed by a computer specially constructed for the desired purposes or by a general purpose computer specially configured for the desired purpose by a computer program stored in a computer readable storage medium.

The references cited in the background teach many principles of operating a storage disk drive that are applicable to the present invention. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Bearing this in mind, attention is drawn to FIG. 1 illustrating a non-limiting example of a schematic functional diagram of a mass storage system where the presently disclosed subject matter can be implemented.

The illustrated mass storage system 102 provides common storage means to be shared by a plurality of host computers (illustrated as 101-1-101-$n$). The storage system comprises a control layer 103 comprising one or more appropriate storage control devices operatively coupled to the plurality of host computers and operable to control I/O operations between the plurality of host computers and a plurality of data storage devices (e.g. a plurality of physical disk drives (PD) organized in one or more arrays illustrated as disk units 104-1-104-$n$). The storage devices constitute a physical storage space optionally distributed over one or more storage nodes, wherein the storage control layer is operable to control interface operations (including I/O operations) between the host computers and the storage physical space. The storage system is configured in a manner enabling direct or indirect serving a request directed at any available address in the physical storage space.

The physical storage space can comprise any appropriate permanent storage medium and can include, by way of non-limiting example, a plurality of physical disk drives (PD) organized in one or more arrays (illustrated as disk units 104-1-104-$n$).

Stored data may be logically represented to a client (user, application, etc.) in terms of logical objects. Depending on storage protocol, the logical objects may be logical volumes, data files, multimedia files, snapshots and other copies, etc. For purpose of illustration only, the following description is provided with respect to logical objects represented by logical volumes. Those skilled in the art will readily appreciate that the teachings of the present invention are applicable in a similar manner to other logical objects.

A logical volume (LV) is a virtual entity logically presented to a client as a single virtual storage device. The logical volume represents a plurality of data blocks characterized by successive Logical Block Addresses (LBA) ranging from 0 to a number $k-1$, wherein k is the number of data blocks in the LV. Different LVs may comprise different numbers of data blocks, while the data blocks are typically of equal size (e.g. 512 bytes). Blocks with successive LBAs may be grouped into data portions that act as basic units for data handling and organization within the system.

When receiving a write request from a host, the storage control layer defines a physical location(s) designated for writing the respective data. Similarly, when receiving a read request from the host, the storage control layer defines the physical location(s) of the desired data portion(s) and further processes the request accordingly. The storage control layer further issues updates of a given data object to all storage nodes which physically store data related to the data object. The storage control layer is further operable to redirect the request/update to storage device(s) with appropriate storage location(s) irrespective of the specific storage control device receiving I/O request.

The storage control layer 103 comprises a cache memory 105 for temporarily storing the data to be written to the storage devices in response to a write command and/or for temporarily storing the data to be read from the storage devices in response to a read command.

The control layer further comprises a cache controller 106 operatively coupled to the cache memory and configured to control an internal activity of the cache memory (e.g. allocating slots to new data or discarding old data from slots, etc.); and a disk controller 107 operable to handle the interchange of data between the cache memory and respective disk drives. The cache memory, the cache controller and the disk controller may be implemented as centralized modules operatively connected to the plurality of storage control devices or may be distributed over a part or all storage control devices. For purpose of illustration only, the following description is made with respect to the cache memory controller handling all control functions requiring interfacing with the cache memory and providing instructions to the disk controller handling all control functions requiring interfacing with the disk drives. Those versed in the art will readily appreciate that the presently disclosed subject matter is, likewise, applicable to equivalent and/or modified functionality consolidated or divided between the cache memory controller and disk controller in another manner. Optionally, the functions of cache controller and disk controller can be combined within a single functional module operationally coupled to the cache memory and the disk drives.

Certain embodiments of the presently disclosed subject matter are applicable to the architecture of the storage system described with reference to FIG. 1. Equivalent and/or modified functionality may be consolidated or divided in another manner and may be implemented in any appropriate combination of software, firmware and hardware. In different embodiments the functional blocks and/or parts thereof may be placed in a single or in multiple geographical locations (including duplication for high-availability); operative connections between the blocks and/or within the blocks may be implemented directly (e.g. via a bus) or indirectly, including remote connection.

For purpose of illustration only, the following description is made with respect to cache memory comprising a plurality of cache data slots of equal size configured such that each cache data slot is to be stored on a corresponding disk track of a respective disk drive. Those versed in the art will readily appreciate that certain aspects of the presently disclosed subject matter are, likewise, applicable to any cache memory supporting data requests fragmented into one or more sets of contiguous data blocks. The term "data track" or "track" used in this patent specification should be expansively construed to include traditional concentric tracks as well as any other portion of a physical storage media of a disk drive, the portion configured to specify position of a drive head during start of read and/or write operations on the physical storage media.

The speed at which a disk drive executes read and write operations requested by a host computer is critical to the performance of the storage system. Performance of a disk drive can be enhanced by decreasing the amount of time that it takes to execute multiple operations. Combining write operations in accordance with a predefined criterion (e.g. proximity of addressed logical block addresses) is known in the art. Non-limiting examples of such a technique are disclosed in U.S. Pat. No. 6,029,226 cited in the background of the present specification.

In accordance with certain embodiments of the presently disclosed subject matter, the disk drive performance can be further enhanced by combining concurrent read and write requests addressed to the same data track of the disk drive. The disk controller is configured in a manner enabling requesting the disk drive to execute as a single task one or more read requests concurrently with executing one or more write requests addressed to the same track, while the disk drive is configured to perform such a request.

Figure 2:
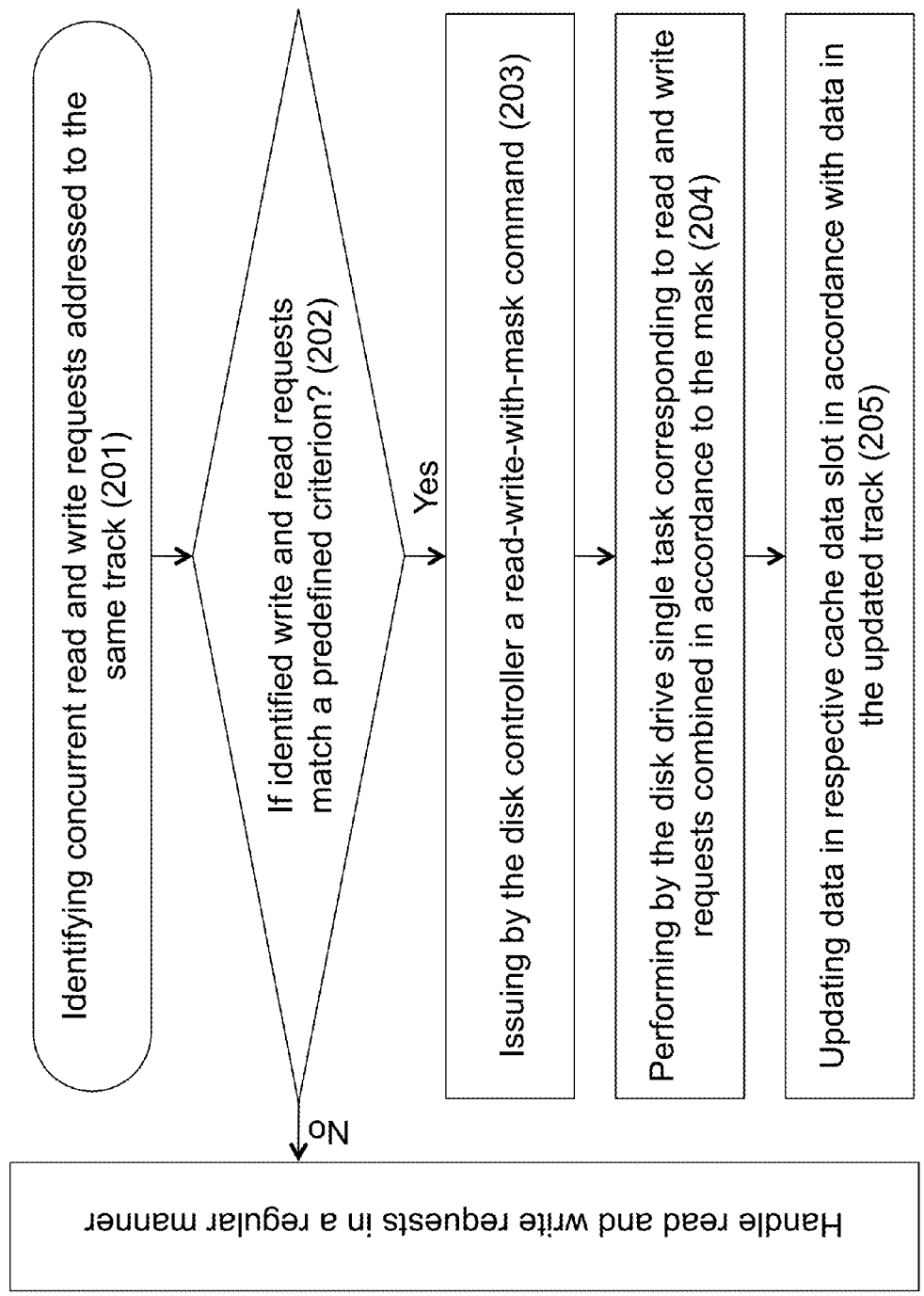
FIG. 2 illustrates a generalized flow-chart of operating the storage system in accordance with certain embodiments of the presently disclosed subject matter.

Referring to FIG. 2, there is illustrated a generalized flowchart of operating the storage system in accordance with certain embodiments of the presently disclosed subject matter.

Before performing one or more write requests addressed to a certain track of a certain disk drive, the cache controller determines whether there is at least one concurrently pending read request addressed to the same track and/or there is a concurrent need to generate such a read request. Unless specifically stated otherwise, it is appreciated that throughout the specification the term "concurrent read and write requests" refers to any read request concurrently pending with received write request, as well as to any read request to be generated by the storage system responsive to the received write request(s).

Upon identification (201) such concurrent read request(s), the cache controller determines (203) if the concurrent write and read requests addressed to the same track match a predefined criterion. The predefined criterion can be characterized by at least one of the following: relation between data blocks addressed in the read and the write requests (e.g. read and write requests are addressed to different data blocks in the same track, read requests partly addresses data block differing from addressed in the write request, etc.); relation between read and write requests (e.g. inter-related requests); origin of the concurrent read request (e.g. read request issued by or to be issued by the cache controller responsive to the received write request); status of cache data slot corresponding to the addressed track, load of a disk drive I/O interface, etc.

A non-limiting example of inter-related concurrent requests is a write request for updating a part of data stored in a certain track and a read request issued or which needs to be issued for updating a respective Error Correction Portion. Typical storage systems implement Error Correction Code by associating every cache data slot with an additional Error Correction Portion referred to hereinafter as ECP. This additional Error Correction Portion comprises meta-data to be used by an Error Correction mechanism (e.g., checksum, CRC, Block-CRC, diff, etc.) implemented in the storage system. ECP corresponding to a slot shall be updated with every update of data in the slot. Accordingly, for completion of any update operation related to a certain cache data slot, the cache memory needs to process data stored in the entire track corresponding to the slot. Thus, in response to a received write request, the cache controller needs to issue a read request to read the entire respective track. The concurrent read and write requests are addressed to the same data track and match pre-defined criterion of ECP-type inter-relation, whilst a read request partly addresses a data block differing from that addressed in the write request, and the overlapping portions of the write and read requests correspond to data blocks to be updated by the write request.

Another non-limiting example of inter-related requests is a write request in RAID configuration and a read request necessary for parity calculations. For example, in N+2 RAID configuration a request for writing several blocks to a certain track involves recalculation of two parity stripes. Accordingly, all tracks related to the RAID group need to be read, including the track addressed in the write request. Likewise in the above ECP case, the concurrent read and write requests are addressed to the same track. The exemplified read and write requests match pre-defined criterion of RAID-type inter-relation, whilst the read request partly addresses data blocks differing from those addressed in the write request, and the overlapping portions of the write and read requests correspond to data blocks to be updated by the write request.

Alternatively or additionally, the criterion may be pre-defined in accordance with a status of the cache data slot corresponding to the addressed track. For example, the criterion is not matched if all data blocks corresponding to the entire addressed track are written in the respective slot of the cache memory. Such criterion will be further detailed with reference to FIG. 5.

Upon identifying concurrent read and write requests addressed to the same data track and matching the pre-defined criterion, the disk controller generates and issues (203) a command to the disk drive for executing a single task corresponding to concurrent read and write requests combined in accordance to a certain mask (this command is referred to hereinafter as READ_WRITE_WITH_MASK command). The command can be generated responsive to request by the cache controller.

As will be further detailed with reference to FIG. 4, the mask comprises a plurality of pointers indicating one or more portions of the data track to be read from and one or more portions of the data track to be written to during executing the single task. The mask can be generated by the cache controller and sent to the disk controller. Alternatively, the mask or parts thereof can be generated by the disk controller in accordance with data (and/or metadata) received from the cache memory and/or the cache controller.

The disk drive is pre-configured in a manner enabling executing one or more read requests concurrently with executing one or more write requests addressed to different data blocks of the same data track. Responsive to READ_WRITE_WITH_MASK command from the disk controller, the disk drive executes (204) the respective read and write requests as a single task.

As will be further detailed with reference to FIG. 5, upon execution of the READ_WRITE_WITH_MASK, the cache controller updates (205) data in respective cache data slot in accordance with data in the updated data track.

The disk controller can communicate with the cache memory and the disk drives in accordance with any appropriate storage protocol. For purpose of illustration only, the following description is made with respect to disk drive configured as a SCSI disk and disk controller operable to control SCSI disks. Those versed in the art will readily appreciate that certain aspects of the presently disclosed subject matter are, likewise, applicable to suitable modifications of any appropriate disk drives and disk controllers operable to communicate with the help of commands addressing one or more sets of contiguous data blocks (e.g. for disk drives and disk controllers thereof operating in accordance with SATA, SAS, ATA, etc.).

When two devices communicate over the SCSI protocol, one acts as an "initiator" and the other acts as a "target." The initiator device causes the target device to perform commands, whereas the target device performs commands from the initiator. The SCSI standard defines a structure of commands. Commands, called a SCSI command descriptor blocks (CDBs), are used by an initiator to request a target to perform particular operations. At the completion of a command (or if a command cannot be completed by the target), the target sends a status byte to the initiator.

Figure 3:
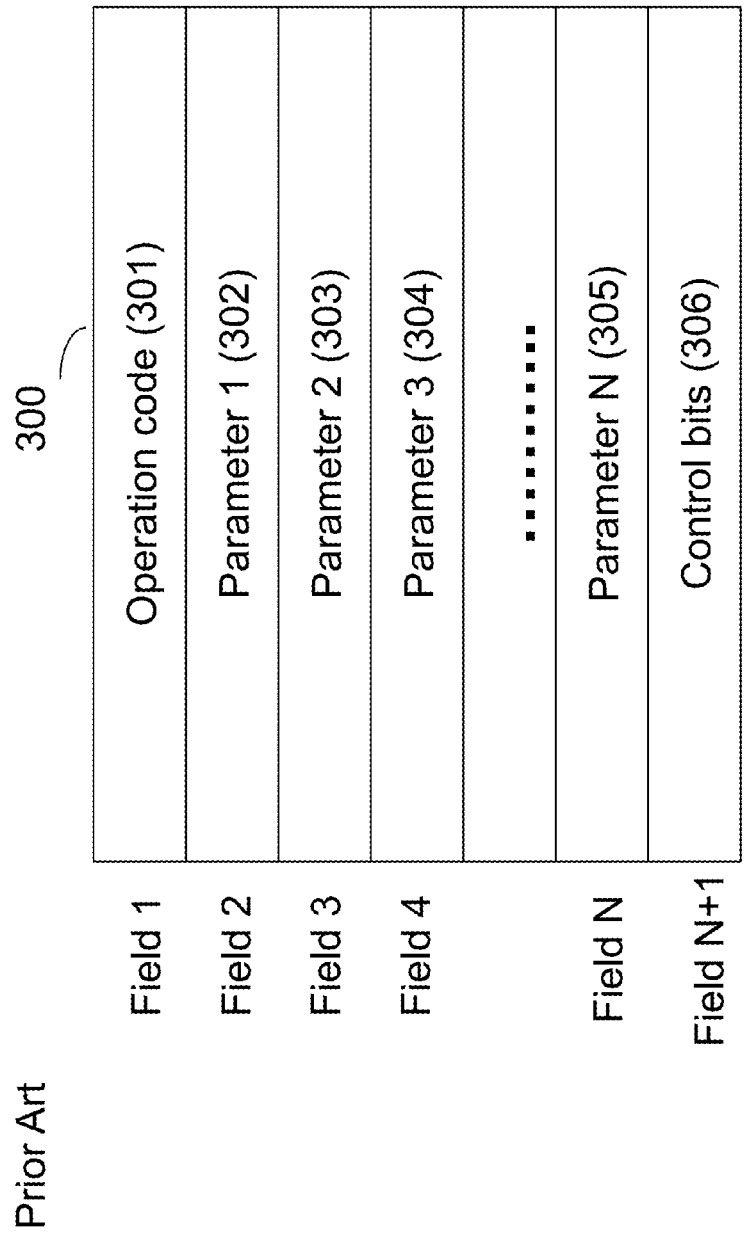
FIG. 3 illustrates a general structure of SCSI Command Descriptor Block as known in the art.

FIG. 3 illustrates a general structure of Command Descriptor Block known in the art. The CDB 300 consists of multiple fields and contains information related to various addresses, control bits, and functional bits used to perform various operations. As illustrated by way of non-limiting example, the CDB 300 comprises a SCSI operation code (301) indicating the type of operation to be performed, N parameter fields (301-305), and one or more control bits (306). Values of the parameter fields may be specific to a type of command specified in the operation code. If the command is a write command, one of the parameter fields in the CDB includes a logical block address of the first block to be transferred as well as the number of blocks to be transferred during the execution of the write command. SCSI CDBs may have a fixed length of six, ten, twelve or sixteen bytes, or a variable length of between 12 to 260 bytes, or more, depending on the command specified in the operation code.

Figure 4:
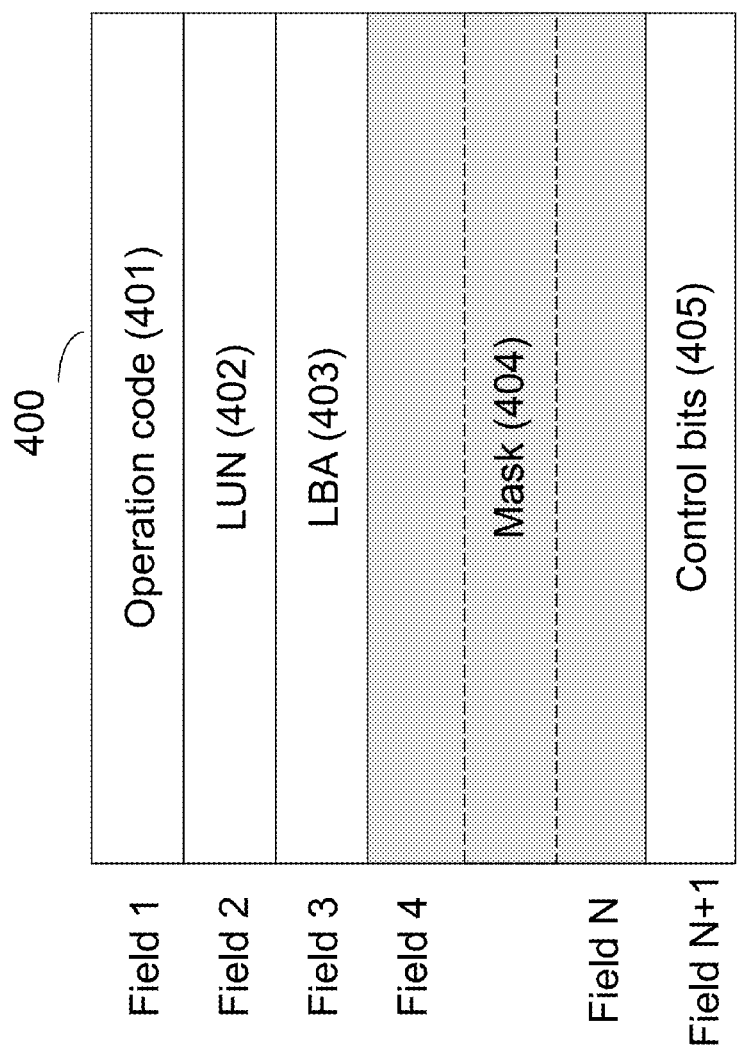
FIG. 4 illustrates an exemplified structure of SCSI Command Descriptor Block in accordance with certain embodiments of the presently disclosed subject matter.

Referring to FIG. 4, there is schematically illustrated a new SCSI CDB 400 configured in accordance with certain embodiments of the presently disclosed subject matter.

SCSI protocol allows amending the well-defined set of standard operations with additional, user-defined commands, compliant with the general CDB structure. The initiator can be configured to issue a new command comprising a new operation code. The new code shall not be in use in the set of standard SCSI operations, and be indicative of a respective user-defined command issued by the initiator to the target. The target, in turn, can be configured to recognize and perform the new, user-defined command coming from the initiator. Thus, the disk controller, acting as initiator, can be configured to issue a new command, and the disk drive, acting as a target, can implement a microcode reprogrammed to add the new command to the set of commands it can enforce.

In accordance with certain embodiments of the presently disclosed subject matter, there is provided a new, READ_WRITE_WITH_MASK, SCSI command, this command to be added to the standard set of SCSI commands. The command comprises one or more read instructions and one or more write instructions addressed to the same track, and a mask comprising a plurality of pointers indicating one or more portions of the data track to be read from and one or more portions of the data track to be written to during executing all respective instructions in a single task. FIG. 4 illustrates an exemplified structure of Command Descriptor Block 400 of the READ_WRITE_WITH_MASK command.

Field 1 of the illustrated CDB 400 comprises a string of operation code 401 (OpCodRWWM) indicative to the disk drive that the issued command is the new, READ_WRITE_WITH_MASK, command generated in accordance with certain embodiments of presently disclosed subject matter. Field 2 indicates a LUN (402) to which the command is addressed. Field 3 indicates the first LBA (403) associated with a track to which this command is issued, this first LBA (403) identifies the entire track addressed by the command. Next fields are devoted to the mask 404. The number and sequence of bits in the mask corresponds to the number and sequence of data blocks in the data track. Each bit in the mask indicates if the corresponding block in the data track shall be read from or written to, during execution of the command. In the illustrated example the data track comprises 512 blocks, and accordingly the size of the mask is 512 bits. The mask 404 is configured as follows: a bit marked as "0" indicates that the data shall be read from corresponding data block in the track, whereas a bit marked as "1" indicates that data shall be written to the corresponding data block in the track when executing the READ_WRITE_WITH_MASK command. Accordingly, the number of "1"s in the mask is equal to the number of data blocks transmitted by the disk controller to the disk drive to be written as part of the command. The last field comprises one or more control bits (406).

Upon receiving the READ_WRITE_WITH_MASK command, the disk drive identifies the addressed track with the help of Field 2 indicating the first LBA (403) in the addressed track, and executes the following operations with regard to the addressed track: a) read and send to the disk controller all blocks of the data track corresponding to "0" marks in the mask; b) write data blocks sent by the controller to the blocks of the data track corresponding to "1" marks in the mask. Thus, responsive to a single READ_WRITE_WITH_MASK command, the disk drive performs SCSI write command(s) for one or more set of contiguous blocks and SCSI read command(s) for one or more set of contiguous blocks. Consequently, these read and write SCSI commands are lined up in the tasks queue of the disk as a single command, and executed by the disk in a single revolution of the disk, while data blocks are concurrently read and written according to the mask.

Upon execution of the READ_WRITE_WITH_MASK, the cache data slot will comprise an updated string of 512 data blocks corresponding to the data blocks in the updated track. The updated string is constituted by updated data blocks written to the track in accordance with "1" marking in the mask, and old data block (not requiring update) read from the track in accordance with "0" marking in the mask.

Figure 5:
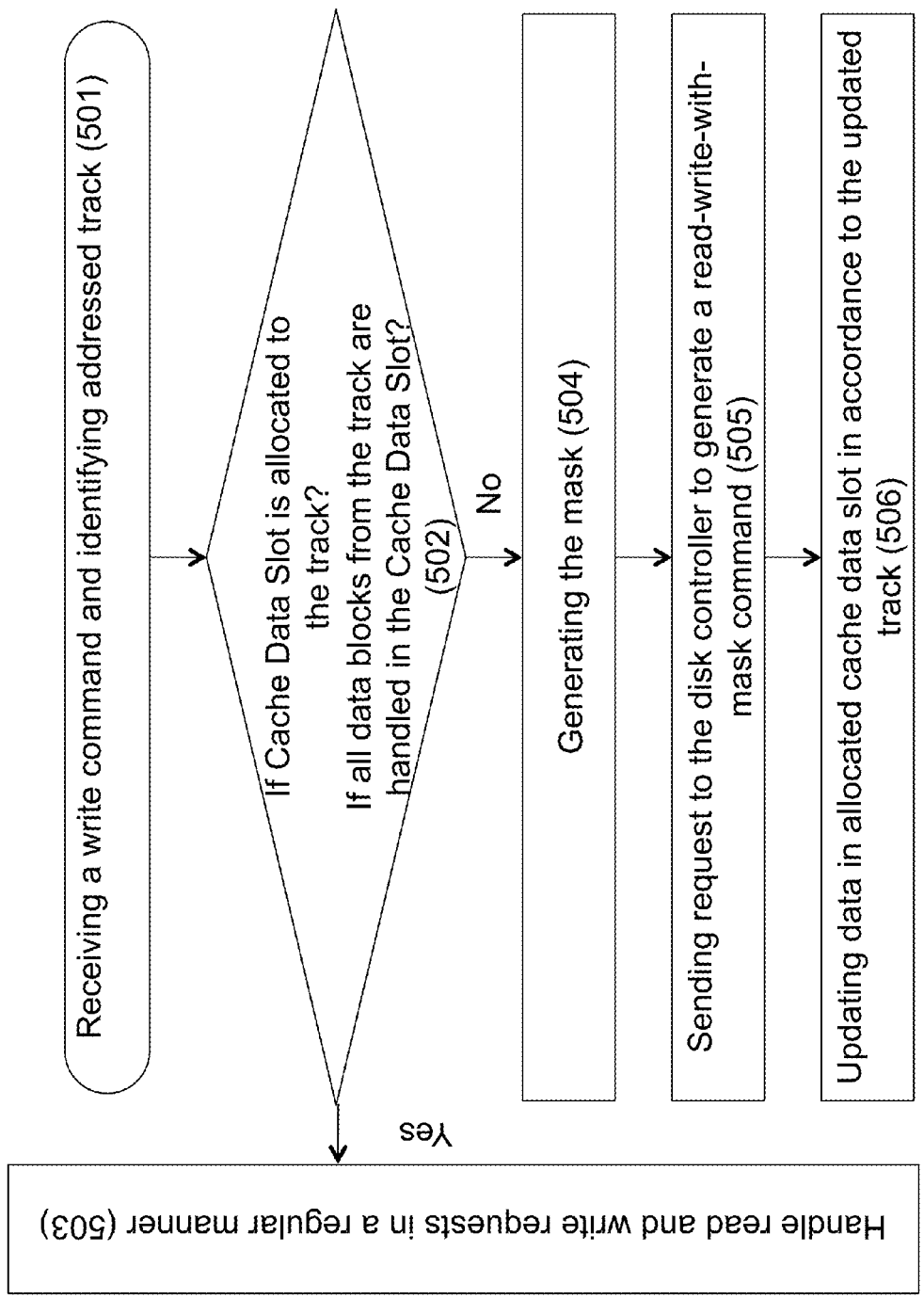
FIG. 5 illustrates a generalized flow-chart of operating a cache memory in accordance with certain embodiments of the presently disclosed subject matter.

Referring to FIG. 5, there is illustrated a generalized flowchart of operating the cache memory in accordance with certain embodiments of the presently disclosed subject matter.

Upon receiving a write request, the cache controller 106 identifies (501) the addressed track. By way of non-limiting example, the identification can be provided with the help of a modulo function that finds the first LBA of the addressed track. The cache controller checks (502) if there is a cache data slot currently allocated to the addressed track. If Yes, the cache controller further checks (502) if all data corresponding to the entire addressed track are currently handled in the allocated cache data slot. If Yes, data received in the write requested are handled (503) in accordance with a regular procedure, namely the disk controller issues a standard SCSI WRITE command followed by overwriting data in the addressed blocks in the track and in the respective blocks in the cache data slot.

If no slot had been allocated to the addressed track, the cache controller allocates a free slot. If the blocks corresponding to the write request have not yet been written to the allocated cache data slot, incoming data are written to respective blocks (currently free) in the cache data slot. By way of non-limiting example, if the write request comprises a string of 100 data blocks starting at block LBAy of LUNi, and if CACHE_ADDR0 is the logical address of the allocated slot within the cache memory, the incoming data is written to currently free blocks starting from a memory block address CACHE_ADDR0+(LBAy−LBAy0), where LBAy0 is the first LBA of the addressed track.

The cache controller further generates (504) the write mask comprising 64 concatenated bytes. All bits in the masks are configured with "0" marking, except bits corresponding to the data blocks of the write request (in the above example, 100 bits starting at a bit whose number corresponds to LBAy-LBAy0), such bits marked as "1".

The cache controller further sends (505) a request to the disk controller to issue a SCSI command READ_WRITE_WITH_MASK for LBAy in LUNi, using the generated write mask. Accordingly, the disk controller send to the disk drive the CDB with the following values: Field 1=OpCodWWW; Field 2=LUNi; Field 3=LBAy0; Fields 4-67=the 64 bytes of the mask. In response, the disk drive returns 412 blocks corresponding to those data blocks in the track that were not modified according to the mask. These data blocks are written to their corresponding locations in the allocated cache data slot. Thus, data in the allocated cache data slot correspond (506) to data in the updated track.

Those versed in the art will readily appreciate that the READ_WRITE_WITH_MASK command can be implemented in a similar manner if the data in the write request constitute a plurality of sequences of consecutive blocks, and not a single consecutive string. Accordingly, the mask can be configured in the manner that sequences of "1" marks correspond to the sequences of consecutive blocks.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a storage system comprising a control layer operatively connected to at least one disk drive comprising a plurality of data tracks, the method comprising:
   a) configuring said at least one disk drive in a manner enabling executing one or more read requests concurrently with executing one or more write requests addressed to the same data track of the disk drive;
   b) responsive to a received write request addressed to a certain track of said at least one disk drive, identifying by the control layer one or more read requests concurrent to said at least one received write request and addressed to the same track;
   c) if the received write request and the identified one or more read requests match a predefined criterion, generating and issuing, by the control layer, a command to said at least one disk drive for executing a single task corresponding to said concurrent read and write requests combined in accordance with a certain mask.

2. The method of claim 1 wherein one or more read requests concurrent to the received write request are selected from the group comprising read request received from a client and concurrently pending with the received write request, read request generated by the storage system responsive to the received write request and concurrently pending with the received write request, and read requests to be generated by the storage system responsive to the received write request.

3. The method of claim 1 wherein the predefined criterion is selected from the group comprising: relation between data blocks addressed in said concurrent read and write requests; relation between said concurrent read and write requests; origin of said one or more concurrent read requests; status of a cache data slot corresponding to the addressed track, and load of I/O interface of said at least one disk drive.

4. The method of claim 1 wherein the predefined criterion is matched when the concurrent read requests partly addresses data block at least partly differing from data blocks addressed in the received write request.

5. The method of claim 1 wherein the predefined criterion is matched when the received write request requires updating a part of data stored in a certain track and the concurrent read request is necessary for updating a respective Error Correction Portion.

6. The method of claim 1 wherein the predefined criterion is matched when the received write request is addressed to a RAID-protected data and the concurrent read request is necessary for respective parity calculations.

7. The method of claim 1 further comprising identifying one or more write requests concurrent to said at least one received write request and addressed to the same track; and wherein the generated command for executing a single task further corresponds to said identified concurrent write requests.

8. The method of claim 1 wherein said certain mask comprises a plurality of pointers indicating one or more portions of the data track to be read from and one or more portions of the data track to be written to during executing said single task.

9. The method of claim 1 wherein said command is a combination of one or more read instructions corresponding to the concurrent read requests, at least one write instruction corresponding to the received write request and said certain mask, wherein said mask comprises a plurality of pointers indicating one or more portions of the data track to be read from and one or more portions of the data track to be written to during executing all respective instructions in a single task, and wherein said read commands and said write command are selected within a set of standard commands available to the disk drive.

10. A computer program comprising non-transitory computer program code means for performing all the steps of claim 1 when said program is run on a computer.

11. A computer program as claimed in claim 10 embodied on a non-transitory computer readable medium.

12. A storage system comprising at least one disk drive comprising a plurality of data tracks and operatively connected to a control layer comprising a cache controller operatively connected to a cache memory and to a disk controller, wherein:
  a) said at least one disk drive is configured to be operable to execute one or more read requests concurrently with executing one or more write requests addressed to the same data track of the disk drive;
  b) said cache controller is configured, responsive to a received write request addressed to a certain track of said at least one disk drive, to identify one or more read requests concurrent to said at least one received write request and addressed to the same track;
  c) said disk controller is configured to generate and issue a command to said at least one disk drive for executing a single task corresponding to said concurrent read and write requests combined in accordance with a certain mask, given that the received write request and the identified one or more read requests match a predefined criterion.

13. The system of claim 12 wherein the cache controller is configured to request the disk controller to generate said command in accordance with said certain mask provided by the cache controller.

14. The system of claim 12 wherein the disk controller is configured, responsive to a request from the cache controller, to generate at least part of said certain mask in accordance with data and/or metadata received from the cache controller, and to generate said command accordingly.

15. The system of claim 12 wherein said certain mask comprises a plurality of pointers indicating one or more portions of the data track to be read from and one or more portions of the data track to be written to during executing said single task.

16. The system of claim 12 wherein said command is a combination of one or more read instructions corresponding to the concurrent read requests, at least one write instruction corresponding to the received write request and said certain mask, wherein said mask comprises a plurality of pointers indicating one or more portions of the data track to be read from and one or more portions of the data track to be written to during executing all respective instructions in a single task, and wherein said read commands and said write command are selected within a set of standard commands available to the disk drive.

17. The system of claim 12 wherein one or more read requests concurrent to the received write request are selected from the group comprising read request received from a client and concurrently pending with the received write request, read request generated by the storage system responsive to the received write request and concurrently pending with the received write request, and read requests to be generated by the storage system responsive to the received write request.

18. The system of claim 12 wherein the predefined criterion is selected from the group comprising: relation between data blocks addressed in said concurrent read and write requests; relation between said concurrent read and write requests; origin of said one or more concurrent read requests; status of a cache data slot corresponding to the addressed track, and load of I/O interface of said at least one disk drive.

19. A disk drive comprising a plurality of data tracks and operable in a storage system comprising a disk controller operatively connected to the disk drive, wherein the disk drive is operable, responsive to a request from the disk controller, to combine one or more read requests with one or more write requests to be all executed as a single task, wherein said read and write requests are concurrent, addressed to the same track and match a predefined criterion.

20. The disk drive of claim 19 further configured to receive a command from the disk controller, said command facilitating to combine said concurrent write and read requests in accordance with a certain mask.

21. The disk drive of claim 20 wherein said certain mask comprises a plurality of pointers indicating one or more portions of the data track to be read from and one or more portions of the data track to be written to during executing said single task.

22. The disk drive of claim 20 wherein said command is a combination of one or more read instructions corresponding to the concurrent read requests, at least one write instruction corresponding to the received write request and said certain mask, wherein said mask comprises a plurality of pointers indicating one or more portions of the data track to be read from and one or more portions of the data track to be written to during executing all respective instructions in a single task, and wherein said read commands and said write command are selected within a set of standard commands available to the disk drive.

23. The disk drive of claim 19 wherein one or more read requests concurrent to the received write request are selected from the group comprising read request received from a client and concurrently pending with the received write request, read request generated by the storage system responsive to the received write request and concurrently pending with the received write request, and read requests to be generated by the storage system responsive to the received write request.

24. The disk drive of claim 19 wherein the predefined criterion is selected from the group comprising: relation between data blocks addressed in said concurrent read and write requests; relation between said concurrent read and write requests; origin of said concurrent read requests; status of a cache data slot corresponding to the addressed track, and load of I/O interface of said disk drive.

25. The disk drive of claim 19 operable in accordance with SCSI protocol.

26. A disk controller operable in a storage system comprising at least one disk drive operatively connected to the disk controller and comprising a plurality of data tracks, wherein the disk controller is operable to issue a command to the disk drive for executing one or more read requests and one or more write requests as a single task, wherein said read and write requests are concurrent, addressed to the same track and match a predefined criterion.

27. The disk controller of claim 26 further configured to issue a command to the disk drive, said command facilitating to combine said concurrent write and read requests in accordance with a certain mask.

28. The disk controller of claim 27 wherein said certain mask comprises a plurality of pointers indicating one or more portions of the data track to be read from and one or more portions of the data track to be written to during executing said single task.

29. The disk controller of claim 27 wherein said command is a combination of one or more read instructions corresponding to the concurrent read requests, at least one write instruction corresponding to the received write request and said certain mask, wherein said mask comprises a plurality of pointers indicating one or more portions of the data track to be read from and one or more portions of the data track to be written to during executing all respective instructions in a single task, and wherein said read commands and said write command are selected within a set of standard commands available to the disk controller and the disk drive.

30. The disk controller of claim 26 wherein one or more read requests concurrent to the received write request are selected from the group comprising: read request received from a client and concurrently pending with the received write request, read request generated by the storage system responsive to the received write request and concurrently pending with the received write request, and read requests to be generated by the storage system responsive to the received write request.

31. The disk controller of claim 26 wherein the predefined criterion is selected from the group comprising: relation between data blocks addressed in said concurrent read and write requests; relation between said concurrent read and write requests; origin of said concurrent read requests; status of a cache data slot corresponding to the addressed track, and load of I/O interface of said at least one disk drive.

32. The disk controller of claim 26 operable in accordance with SCSI protocol.

* * * * *